United States Patent [19]
Staschko et al.

[11] Patent Number: 5,976,712
[45] Date of Patent: Nov. 2, 1999

[54] MULTILAYER MATERIAL FOR SLIDING ELEMENTS AND PROCESS AND MEANS FOR THE PRODUCTION THEREOF

[75] Inventors: Klaus Staschko, Idstein; Hans-Ulrich Huhn, Schlangenbad; Klaus Müller, Wiesbaden; Joachim Heyer, Neunkirchen, all of Germany

[73] Assignee: Federal-Mogul Wiesbaden GmbH, Germany

[21] Appl. No.: 08/849,238

[22] PCT Filed: Dec. 6, 1995

[86] PCT No.: PCT/DE95/01760

§ 371 Date: Jun. 6, 1997

§ 102(e) Date: Jun. 6, 1997

[87] PCT Pub. No.: WO96/17980

PCT Pub. Date: Jun. 13, 1996

[30] Foreign Application Priority Data

Dec. 9, 1994 [DE] Germany .............................. 44 43 806

[51] Int. Cl.$^6$ .................................................... B32B 15/01
[52] U.S. Cl. ............................................ 428/645; 428/614
[58] Field of Search .................................... 428/614, 644, 428/649, 645

[56] References Cited

U.S. PATENT DOCUMENTS

| | | | |
|---|---|---|---|
| 5,137,792 | 8/1992 | Hodes et al. | 428/614 |
| 5,185,216 | 2/1993 | Tanaka et al. | 428/614 |

FOREIGN PATENT DOCUMENTS

| | | |
|---|---|---|
| 2 256 235 | 12/1992 | United Kingdom . |
| 2 256 903 | 12/1992 | United Kingdom . |
| 2 257 759 | 1/1993 | United Kingdom . |

*Primary Examiner*—Deborah Jones
*Assistant Examiner*—Darlene David
*Attorney, Agent, or Firm*—Reising, Ethington, Barnes, Kisselle, Learman & McCulloch, P.C.

[57] ABSTRACT

A multilayer material is described, whose overlay exhibits improved hardness and improved wear-resistance. The multilayer material includes an overlay, which contains 8–18.5 wt. % tin and 2–16 wt. % copper, the balance being lead, wherein the tin is present as a finely crystalline deposit completely homogeneously distributed in the lead. A process for producing sliding elements in which the overlay of lead-tin-copper is applied to the prefabricated semi-finished product by electroplating provides that a ternary, fluoroborate-free electroplating bath is used without brighteners and with the addition of fatty acid polyglycol ester and a grain refining agent including a carboxylic acid.

3 Claims, 2 Drawing Sheets

MULTILAYER MATERIAL FOR SLIDING ELEMENTS AND PROCESS AND MEANS FOR THE PRODUCTION THEREOF

BACKGROUND OF THE INVENTION

1. Field of Invention

The invention relates to a multilayer material for sliding elements which having a backing and an overlay of lead bronze. The invention also relates to a process for producing sliding elements which an overlay of lead-tin-copper is applied to the prefabricated semi-finished product by electroplating, as well as to means for carrying out the process.

2. Description of Prior Developments

Sliding elements should be understood to mean all types of bearing liners as well, inter alia, as pistons and piston rings. Overlays of multilayer materials for sliding elements are generally produced by electroplating in appropriate electrolyte baths. There have hitherto generally been used for this purpose fluoroborate-containing baths, which exhibit a number of disadvantages, however.

When baths are used, organic constituents and tin oxidation inevitably cause impurities to arise, which detract from the quality of the electroplated layer. As a rule, owing to their greater weight these impurities settle on the bottom of the tank and do not affect electroplating unless the bath is moved. However, if circulation of the bath cannot be effected for these reasons, a concentration gradient of the metal ions provided for plating arises. Since the sliding elements to be plated, such as bearing liners for example, are stacked one above the other in receptacles, an increase in layer thickness from top to bottom will inevitably occur.

Such concentration gradients could be prevented by constant movement of the bath, though a prerequisite of this would be that no impurities are whirled up or that the bath is filterable. The tetravalent tin oxide, which is present in fluoroborate baths, is generally not filterable, however. Moreover, undesired tin oxidation would be encouraged by the increased oxygen supply from the air.

A further disadvantage of known baths consists in the fact that, despite the provision of a thief cathode in the electroplating bath, it is impossible to prevent currentless deposition of bearing metals on the bearing backing during the electroplating process. Owing to the high copper concentrations, for example in electrolytes for ternary layers, copper is deposited currentlessly and without check on the bearing backings of the bearing liners, which process is known as cementation. This copper layer exhibits only limited bonding to the steel backing and thus has a tendency, after tinning, towards bubble formation and flaking. On the one hand, this entails a material loss and on the other hand, the operability of the bearing may be impaired by flaking of the cementation layer.

The current densities used are limited to 2.2 A/dm$^2$ in known electroplating baths. Although higher current densities shorten the electroplating process, the deposition rates of the metals diverge within the bearing liner surface and receiving stack, such that the deposited layer no longer has the desired composition. Stable deposition is not possible, therefore, at higher current densities.

Some overlays, especially ternary layers, produced with known baths exhibit considerable variations in thickness, which may possibly necessitate post-machining. Furthermore, the tin is not evenly distributed in the overlay, which may cause aggregation and coarse crystalline deposits, known as tin-agglomerations. This inhomogeneous structure of the overlay promotes tin diffusion, which occurs when the sliding element is exposed to relatively high heat levels during operation, such that such overlays may only be applied to an intermediate layer, such as a nickel barrier for example, which prevents tin diffusion into the lead-bronze layer thereunder, as described, for example, in E. Römer "Werkstoff und Schichtaufbau bei Gleitlagern" ("Material and Layer Structure in Plain Bearings"), an offprint from ZFW Zeitschrift für Werkstofftechnik ("Journal of Materials Technology"), volume 4, issue 7, Verlag Chemie Weinheim/ Bergstraße 1973. Only through this additional measure has it hitherto been possible to improve corrosion resistance and to prevent detachment phenomena in the overlay, which may lead to bearing damage. Moreover, the hardness of these known overlays and thus their wear resistance are inadequate.

The inhomogeneous structure of the overlay connected with conventional electroplating baths was deliberately exploited for diffusion in the process according to DE 41 03 117 C2. A layer of a binary or ternary basis alloy with a relatively low tin content was applied by electroplating to a backing layer, as desired. A further layer with a markedly higher tin content was then applied to this layer. By time-controlled thermodiffusion treatment, the tin was allowed to diffuse into the base alloy, until it was distributed in the desired amount at the future running surface. Since the inhomogeneous, coarse crystalline structure of the overlay is still present even after heat-treatment, the diffusion processes may continue in the operational stage of the sliding element. To prevent negative effects at the interface with the backing layer, a diffusion barrier layer is therefore provided.

From DE-OS 27 22 144 it is known to use an alloy, of which more than 6 to 10 wt. % is copper, 10 to 20 wt. % is tin and the rest is lead, as a soft metal bearing alloy for multilayer plain bearings. This alloy may, inter alia, be applied by electrodeposition, an intermediate layer of nickel being provided as the diffusion barrier. This known alloy, which is provided with conventional electrolyte baths, exhibits coarse tin distribution.

"Galvanisches Abscheiden von Zinn-Blei aus Fluoroborat und fluoroboratfreien Elektrolyten" ("Electrodeposition of tin-lead from fluoroborate and fluoroborate-free electrolytes") by H. van der Heijden in "Metalloberfläche" ("Metal surface") 39(1985) 9, pages 317 to 320, describes the plating of electronic components. It has been shown that tin and lead are easily soluble in various organic sulphonic acids of the general formula $RSO_3H$, wherein R represents an alkyl group. The sulphonic acids are described as completely stable during electrolysis. As little mention is made of the use of such fluoroborate-free baths for the electroplating of sliding elements as of additives suitable for and necessary in the production of sliding elements.

Aqueous, acidic solutions for the electrolytic deposition of tin and/or lead/tin alloys are known from DE 39 02 042 Al. These binary electroplating baths are used as corrosion protection, e.g. for printed circuit boards and batteries, a relatively soft layer being deposited which is not wear-resistant and cannot therefore be used for sliding elements. In addition to metal salts, inhibitors and free alkane sulphonic acid, these known electroplating baths comprise brighteners, which render impossible the use of these baths as ternary baths, for example.

It has been shown that, when, for example, copper salts are added, only a maximum of 1% copper can be deposited, because the bath composition is essentially conformed to tin.

JP 02-93 096 (Pat. Abstr. of Japan, C-732, Vol. 14/No. 294) describes a process for producing sliding elements, in which the overlay of Pb—Sn—Cu is applied to the prefabricated semi-finished product by electroplating. For this purpose, a fluoroborate-free electrolyte is used without brightener but with free alkyl sulphonic acid and non-ionic wetting agents. With these known electroplating baths, however, again only coarse deposition of the tin is achieved, the layer structure generally being irregular. The considerable demands made of plain bearings are not wholly satisfactorily fulfilled.

The additives necessary for the production of sliding elements are not mentioned, such that in the end it is once again only possible to use current densities of up to 3 A/dm$^2$.

SUMMARY OF THE INVENTION

The object of the invention is therefore a multilayer material whose overlay exhibits greater hardness and improved wear-resistance, as well as a process for the production of such overlays, which results in an improved quality of electrodeposited layer, wherein the residence time in the baths used is greater. Finally, the object is also to make available a means for carrying out the process.

The finely crystalline deposition and completely homogeneous distribution of the tin means that localised tin agglomeration no longer occurs. In electron micrographs with up to 1000-times enlargement it is not possible to identify the finely distributed tin as particles with defined diameters. There are markedly fewer lattice defects and no incorporation of disturbing foreign atoms into the overlay, such that packing density is far higher than with known Pb—Sn—Cu overlays. The result is greater overlay hardness, which, in the case of the multilayer material according to the invention, is from 10 to 50 HV, and greater wear-resistance. The hardness for a predetermined composition is at least 20% higher than for conventional overlays with the same alloy composition.

It has been shown that this finely crystalline deposition of the tin with completely homogeneous distribution is ensured when the tin content is from 8 to 18.5 wt. % and that of the copper is from 2 to 16 wt. %, the rest consisting of lead.

Moreover, it has surprisingly been established that tin diffusion, which usually occurs as a result of the increase in temperature during operation of the plain bearings made of such multilayer materials, is observed far less or not at all. This advantageous effect is also a result of the finely crystalline deposition of the tin, which obviously restricts the mobility of the tin to such an extent that only slight diffusion effects can occur. It is thus possible to dispense with an intermediate layer, such as a so-called nickel barrier for example. If the overlay forms the ternary layer of a multilayer material, it may preferably be applied directly to the lead-bronze layer, which is located inside the steel backing liner.

The process for producing sliding elements of such multilayer materials is characterised in that a fatty acid glycol ester and a grain refining agent comprising a carboxylic acid are used in the electroplating bath. It has been shown that only through use of the grain refining agent is finely crystalline deposition possible, which prevents tin diffusion processes. The fatty acid glycol ester has a positive effect on the uniformity of deposition. While in known processes marked elevations occurred in the edge areas of grooves, bores and the like, these can no longer be detected. The fatty acid glycol ester obviously has an effect on the ion distribution in the electroplating bath, which also leads, in the end, to more even deposition. It has been shown that it is not only possible to avoid variations in thickness, but also to reduce surface roughness markedly.

The electroplating bath preferably comprises a methane sulphonic acid.

In addition to the metals to be deposited, a preferred bath composition comprises 30–200 g/l of free methane sulphonic acid, 5–125 ml/l of non-ionic wetting agent, 5–25 ml/l of grain refining agent and 0.01 to 1 g/l of fatty acid glycol ester.

By omitting the brighteners, which are present in conventional fluoroborate-free baths, and by adding non-ionic wetting agents it becomes possible to deposit copper in lead-tin alloys in the desired amount.

Aryl polyglycol ether and/or alkylaryl polyglycol ether are used as non-ionic wetting agents.

The electroplating baths according to the invention are distinguished by high stability, since the alkyl sulphonic acid does not decompose during electrolysis. Uniform, virtually 100% current efficiency is thereby obtained at both the cathode and the anode.

Through the use of the non-ionic wetting agents, copper deposition on the bearing backing is so greatly reduced that it is negligible.

To prevent any concentration gradients arising in the electroplating bath, the electroplating bath is preferably made to circulate constantly. Circulation of the electroplating bath is preferably coupled with filtration during the electroplating process, such that impurities contained in the electroplating bath are continually removed. Filtration of the electroplating bath is made possible in that the wetting agents used are filterable and tin oxidation occurs only within low limits.

The circulation and filtration considerably increase plating quality. Variations in the thickness of the electrodeposited layer from the bottom to the top of the bearing stack and defects in the plating proved capable of considerable reduction. Moreover, it has been shown that the electroplating baths according to the invention could be used for an unlimited period, especially, even, when high concentrations of metals to be deposited were contained in the electroplating bath.

During electroplating it is preferably possible for current densities of from 2 to 20 A/dm$^2$ to be used. No alterations in the plating composition were detected as a result. Through the use of such high current densities, the advantage of rapid deposition is achieved. It is therefore possible to reduce the duration of the process almost by a factor of 10. The new process is therefore also suitable for high-speed deposition and thus for electroplating of a strip. It is thus possible to set up high capacity mass-production.

The electroplating bath is preferably kept at a temperature of below 25° C., because otherwise controlled deposition is no longer possible.

Since the bath heats up during the electroplating process, it has to be cooled accordingly.

The means for carrying out the process comprises an electroplating bath containing 50–100 g/l of lead as lead methane sulphonate, from 6 to 20 g/l of tin as tin methane sulphonate, from 2 to 16 g/l of copper as copper methane sulphonate, from 30 to 200 g/l of free methane sulphonic acid and from 5 to 125 ml/l of non-ionic wetting agents, 5–25 ml/l of grain refining agent and 0.01–1 g/l of a fatty acid glycol ester, but no brighteners. The non-ionic wetting agents are preferably aryl polyglycol ether and/or alkylaryl polyglycol ether of the formula $C_nH_{(n+1)}$—Ar—$(OCH_2$—$CH_2)_m$—$OCH_2$—$CH_3$, where n=0 to 15, m=5–39 and Ar is an aromatic residue. The grain refining agent preferably comprises an σ-β-unsaturated carboxylic acid of the general formula

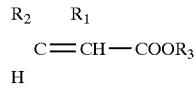

where $R_1$ and $R_2$ are the same or different and hydrogen or lower alkyl groups with from 1 to 3 C atoms and $R_3$ is hydrogen or lower alkyl with from 1 to 5 C atoms. The content of aryl polyglycol ether and/or alkylaryl polyglycol ether is preferably 40–100 ml/l and that of the grain refining agent is 5–15 ml/l.

fatty acid polyglycol ester is 0.02 g/l for all bath compositions. It should be noted that all the hardness values lie in the range of from 10 to 50 HV and are thus markedly higher than the hardness values of conventional ternary layers.

FIGS. 1a and 1b represent two photomicrographs, FIG. 1a showing a multilayer material according to the prior art and FIG. 1b one such according to the invention.

FIG. 1a shows a multilayer material 1a, which comprises a steel backing 2a, a lead-bronze layer 3a, a nickel barrier 4a and a ternary layer 5a. The ternary layer has the composition PbSn14Cu8 and was produced with a fluoroborate-containing electroplating bath. Tin agglomerations 6a can clearly be seen in the ternary layer. Overall, the ternary layer 5a has an inhomogeneous structure and a rough surface.

| Bath Composition | | | | | | current | exposure | ternary layer | | | hardness |
|---|---|---|---|---|---|---|---|---|---|---|---|
| Cu | Sn | Pb | sulphonic acid | Inh. N. | Inh. L | density | period | Cu | Sn | Pb | |
| g/l | g/l | g/l | g/l | ml/l | | A/dm² | [min] | Gew.-% | | | HV |
| 2 | 8 | 80 | 120 | 30 | 12 | 2.4 | 90* | 2 | 8 | Rest | 10 |
| 2 | 10 | 80 | 120 | 35 | 14 | 2.4 | 90* | 2 | 10 | Rest | 15 |
| 2 | 18.5 | 80 | 120 | 40 | 20 | 2.4 | 90* | 2 | 18.5 | Rest | 20 |
| 8 | 8 | 80 | 120 | 60 | 14 | 2.4 | 90* | 8 | 8 | Rest | 24 |
| 8 | 10 | 80 | 120 | 60 | 16 | 2.4 | 90* | 8 | 10 | Rest | 26 |
| 8 | 18.5 | 80 | 120 | 80 | 17 | 2.4 | 90* | 8 | 18.5 | Rest | 38 |
| 14 | 8 | 80 | 120 | 90 | 16 | 2.4 | 90* | 14 | 8 | Rest | 42 |
| 14 | 10 | 80 | 120 | 90 | 21 | 2.4 | 90* | 14 | 10 | Rest | 45 |
| 14 | 18.5 | 80 | 120 | 90 | 30 | 2.4 | 90* | 14 | 18.5 | Rest | 50 |

*) layer thickness of 90 μm

Exemplary embodiments will be described in more detail below with the aid of the Figures.

The aforementioned objects, features and advantages of the invention will, in part, be pointed out with particularity and will, in part, become obvious from the following more detailed description of a preferred embodiment of the invention, taken in conjunction with the accompanying diagrammatic Figures, which form an integral part thereof.

DETAILED DESCRIPTION OF THE INVENTION

The following Table is a summary of preferred bath compositions, current densities and the ternary layers obtained on a plain bearing consisting of a steel backing and a lead-bronze layer. Inhibitor N designates a wetting agent based on alkylaryl polyglycol ether and inhibitor L designates an additive comprising, in addition to ca. 30% of carboxylic acid, up to a third of aryl polyglycol ester and/or alkyl aryl polyglycol ether, the rest being water. These wetting agents are sold, for example, by Blasberg/Solingen under the Trade Names BN 160308 Stannostar HMB and BN 160309 Stannostar HMB respectively. The content of FIG. 1b shows a multilayer material 1b according to the invention. On the steel backing 2b there is again located a lead-bronze layer 3b, on which there is directly applied, i.e. without nickel barrier, the ternary layer 5b, which consists of 18.44% Sn and 7.38% copper, the rest being lead. In the 1000-times enlargement shown here the tin may be clearly seen as a finely crystalline, homogeneously distributed deposit.

Overall, the ternary layer 5b exhibits good bonding and only very slight tin diffusion could be detected even after heat treatment at 170° C. for 1000 hours. The hardness of this ternary layer 5b is 38 HV.

Figure 1A:
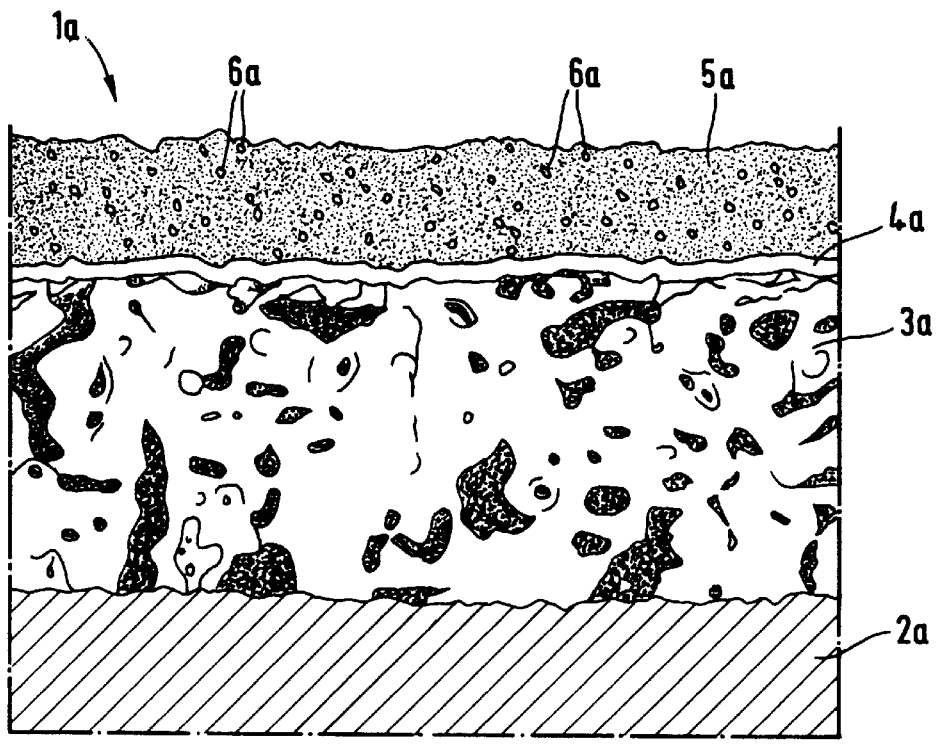
FIGS. 1a, b are electron micrographs of a multilayer material according to the prior art and according to the invention, and FIGS. 2a, b are two diagrams which show the surface roughness of an overlay according to the prior art and according to the invention.
Figure 1B:
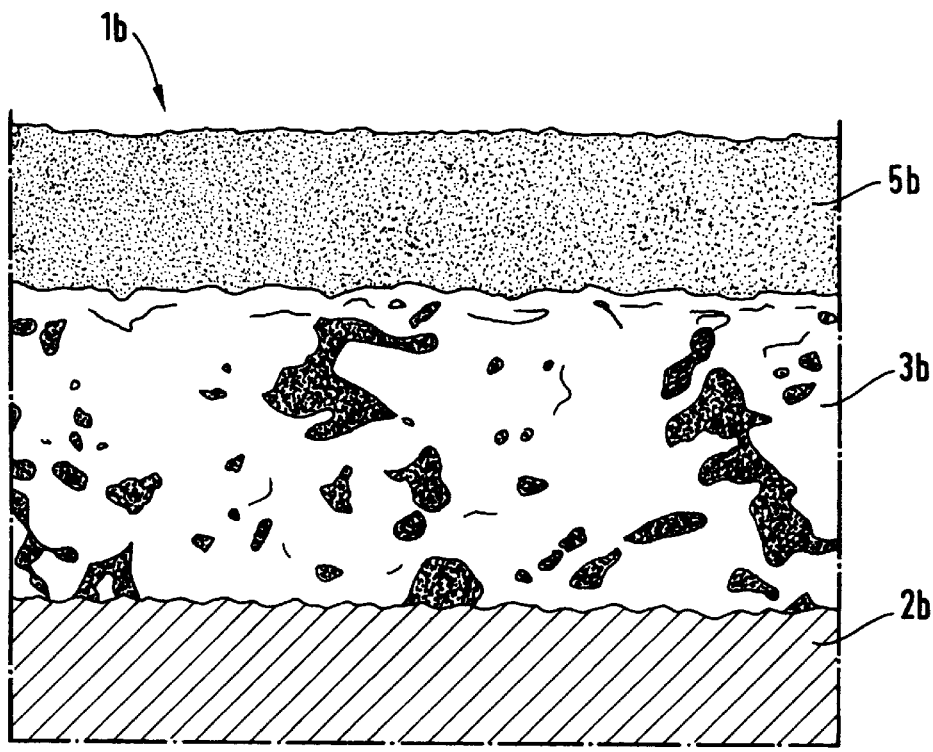
Figure 2A:
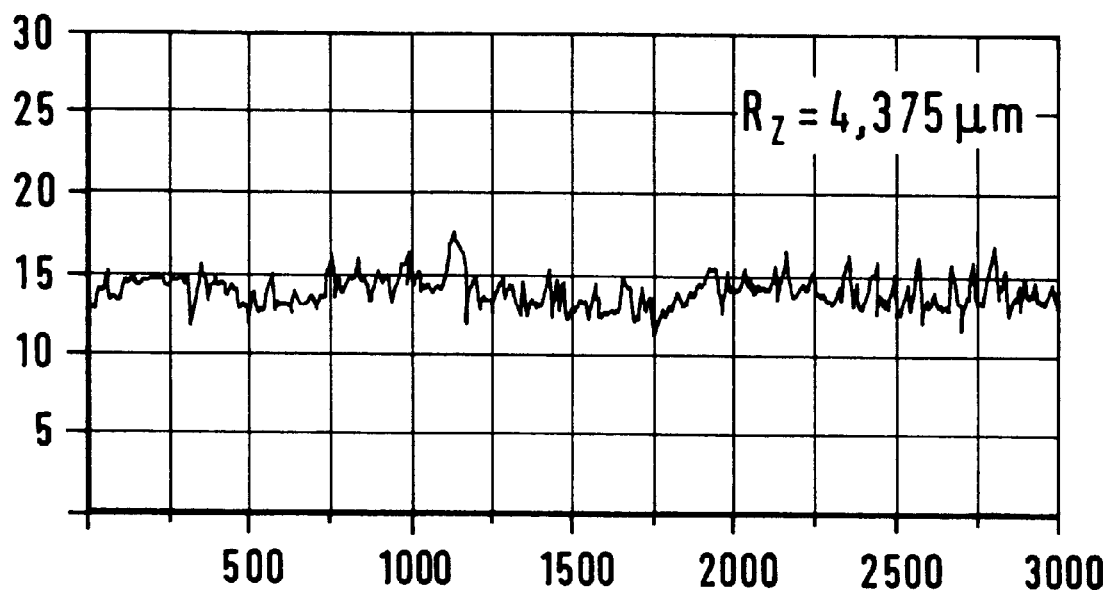
Figure 2B:
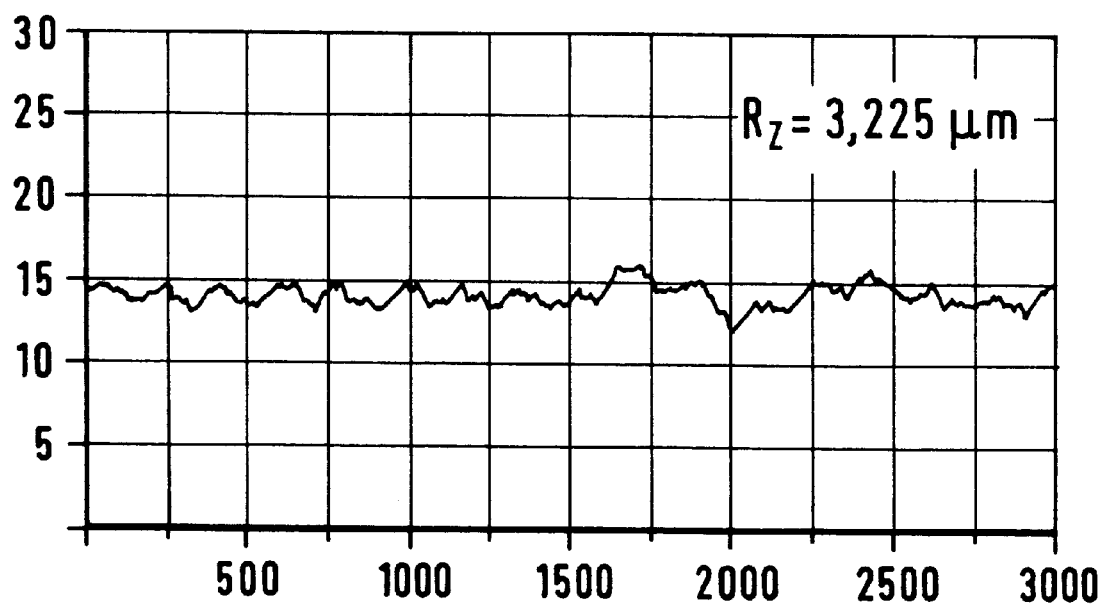

FIGS. 2a and 2b illustrate the surface roughness of the multilayer materials shown in FIGS. 1a and 1b. It may be clearly seen that the surface roughness shown in FIG. 2a, which relates to the multilayer material according to FIG. 1a, is far greater than that of FIG. 2b. The average roughness was $R_z$ 4.375 μm for the curve shown in FIG. 2a and $R_z$ 3.225 μm for the curve shown in FIG. 2b.

An example of a bath composition is as follows:

| | |
|---|---|
| Total quantity | 250 l |
| Pb | 50–100 g/l |
| Sn | 6–20 g/l |
| Cu | 2–16 g/l |
| free methane sulphonic acid | 100–160 g/l |
| wetting agent N | 40–100 ml/l |
| wetting agent L | 5–25 ml/l |
| wetting agent based on polyglycolether | 0.01–0.05 g/l |

The following deposition table was drawn up with a bath of this composition.

Deposition table:

| Exposure time in mins. | 2 A/dm² | 3 A/dm² | 5 A/dm² | 10 A/dm² | 20 A/dm² |
|---|---|---|---|---|---|
| 15 | 16 μm | 25 μm | 40 μm | 80 μm | 160 μm |
| 30 | 32 μm | 50 μm | 80 μm | 160 μm | 320 μm |
| 60 | 64 μm | 100 μm | 160 μm | 320 μm | 640 μm |

Even at high current densities of 20 A/dm², with which thick overlays may be applied in a relatively short time, it proved possible to maintain the desired alloy composition.

Furthermore, plain bearing layers were examined with respect to their position in the receiving device used for electroplating.

| Position in receptacle | Pb | Sn | Cu |
|---|---|---|---|
| top | rest | 11.89 | 5.83 |
| middle | rest | 11.65 | 6.79 |
| bottom | rest | 11.21 | 6.74 |

It may be seen from this that, irrespective of the position of the plain bearing in the receptacle, only very slight differences may be detected in the alloy composition.

Obviously, numerous modifications and variations of the present invention are possible in the light of the above teachings. It is therefore to be understood that within the scope of the appended claims the invention may be practised otherwise than as specifically described herein.

What is claimed is:

1. A multilayer material for sliding elements, the multilayer material comprising a backing and an overlay of 8–18.5 wt. % tin and 2–16 wt. % copper, the balance being lead, wherein the overlay has a matrix of lead and the tin is present in the form of a finely crystalline deposit completely homogeneously distributed throughout the lead matrix.

2. The multilayer material as claimed in claim 1, wherein the overlay exhibits a hardness of 10–50 HV.

3. The multilayer material as claimed in claim 1, further comprising a lead bronze layer provided between the backing and the overlay, and wherein the overlay is applied to the lead-bronze layer without an intermediate layer.

* * * * *